W. H. Wright,
Cattle Pump.
No. 100,485. Patented Mar. 1, 1870.
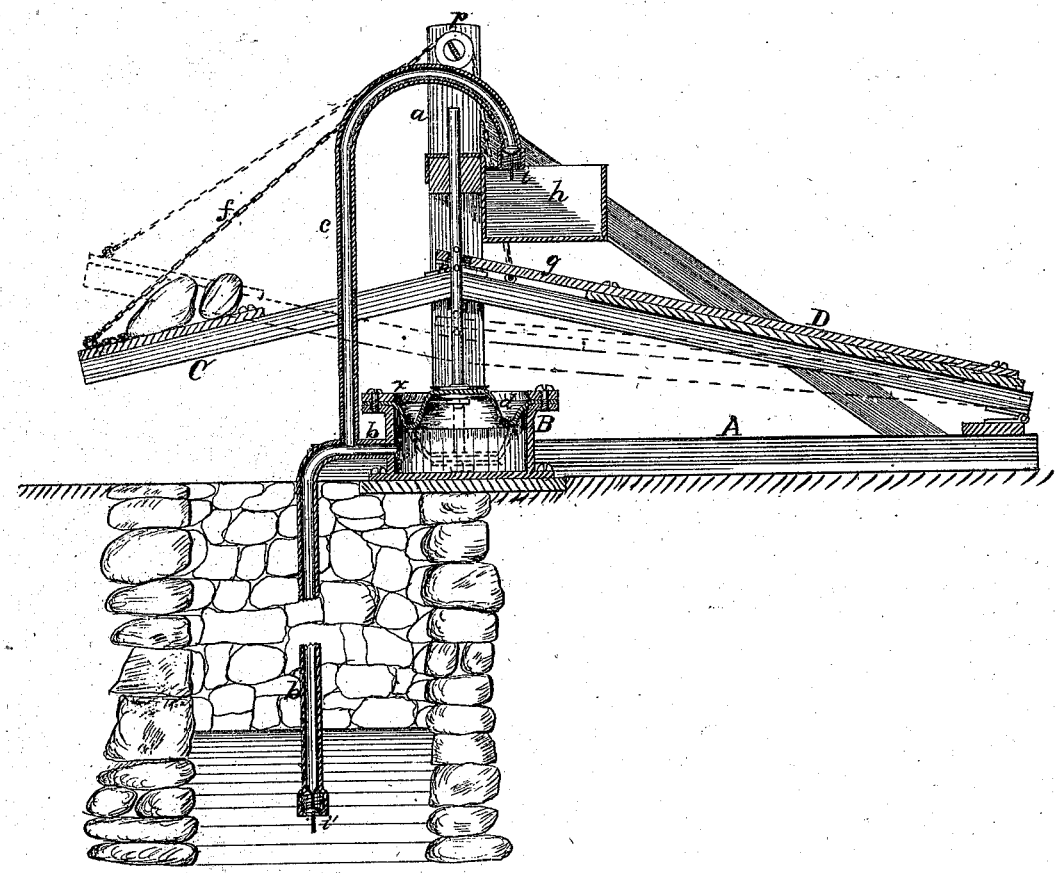
Witnesses:
H. H. Clement
J. M. Howe
Inventor:
W. H. Wright
By Wm. Loughborough
Atty

United States Patent Office.

WILLIAM H. WRIGHT, OF ROCHESTER, NEW YORK.

Letters Patent No. 100,485, dated March 1, 1870.

IMPROVEMENT IN CATTLE-PUMPS.

The Schedule referred to in these Letters Patent and making part of the same.

*To all whom it may concern:*

Be it known that I, WILLIAM H. WRIGHT, of Rochester, in the county of Monroe, and State of New York, have invented certain new and useful Improvements in Stock-Pumps; and I do hereby declare that the following is a full, clear, and exact description thereof, reference being had to the accompanying drawing making part of this specification, in which—

The figure represents a sectional elevation of my invention.

The object and nature of my invention will be understood by reference to the drawing and specification; and to enable others to make and use the same, I will describe its construction and operation.

I support my improved pumping apparatus upon a frame, A, composed of suitable horizontal and vertical timbers, firmly bolted together and braced.

The pump-barrel B is bolted to this frame at a proper point between the uprights $a$, and has a connection with the well or cistern through the pipe $b$, to a branch of which latter the discharge-pipe $c$ is also attached.

The pump-barrel is provided with a flexible diaphragm, $d$, operating similarly to a plunger, and securely attached to the barrel by means of the flange $x$ and suitable bolts or screws.

The rod $e$ is fastened to the diaphragm by suitable washers above and below, as shown, and works in guides provided upon the frame A.

The approach-platform D, upon which the animal walks, is hinged at the outer end to the frame A, and the inner end, directly over the center line of the pump-barrel, to a balance table, C.

The outer end of this table is sustained by chains or cords, $f$, running over pulleys $p$ upon the uprights $a$, and connected to the platform A at a point near enough to the hinged joint $n$ to obtain sufficient power to lift the counter-weights of the animal upon D.

The bar $g$, secured to the platform through a slot, in the end of which the plunger-rod $e$ passes, operates the pump by means of suitable collars or pins upon the plunger-rod.

The discharge-pipe $c$ is bent in a proper shape to empty into the trough $h$, and is provided at the discharge with a valve, $i$, held to its seat by a spring or other equivalent device. A similar valve is placed at the foot of the suction-pipe $b$, and the chambers which contain these valves may be made removable, for convenience in constructing, repairing, or cleaning.

It is obvious that the pump and frame may be located any distance away from the well, or immediately over it, as desirable. When the animal steps upon the platform D, the diaphragm is pushed down, forcing the water in the barrel B up the pipe $c$, while the balance-weights are raised to the position shown in dotted lines by means of the chains $f$ and pulleys $p$; when the animal steps off, the counter-weight returns the parts to their original position, filling the pump-barrel for another similar operation.

It will be seen that by the use of the chains $f$ and pulleys $p$, the weight of the animal acts directly upon the counter-weight, obviating the necessity of the fixed fulcrum for the balance table, whereby the length of the apparatus is reduced much below those in common use, and the manufacturer is enabled to fit up all the parts before leaving the shop, and the purchaser is not obliged to construct any portion of them. The pump may thus be taken apart for shipment, and quickly put up in the required location. By supporting all the parts upon the bed A, the entire apparatus may be removed at any time by simply detaching the suction-pipe. In the arrangement of the pipes and valves, as shown, I attain great simplicity as well as convenience in the adjustment of the parts, since only one pipe-connection has to be made to put the pump in operation, and the valves are easily accessible at any time. In cold climates it may be desirable to drop the pump-barrel B a short distance below the surface of the ground, and also to wrap the delivery-pipe with a non-conductor.

What I claim as my invention, and desire to secure by Letters Patent of the United States, is—

1. The platform D, hinged at the outer or approach end, and suspended at the opposite end by the chains $f$, which pass over pulleys $p$, and are connected to said platform and balance table C, as herein shown and described.

2. The arrangement of the suction-pipe $b$ with its foot valve, and the bent delivery-pipe $c$, and valve $i$, in combination with the pump B, platform D, and the table C, for the purposes set forth.

W. H. WRIGHT.

Witnesses:
WM. S. LOUGHBOROUGH,
P. T. TURNER.